2,982,706

HIGH UNSATURATION IRRADIATED BUTYL RUBBER

Theodore Lemiszka, Rahway, and James E. Shewmaker, Fanwood, N.J., assignors to Esso Research and Engineering Company, a corporation of Delaware No Drawing. Filed May 6, 1958, Ser. No. 733,278

14 Claims. (Cl. 204—154)

This invention relates to the preparation of high molecular weight, highly unsaturated, rubbery polymers of multi-olefins, especially isobutylene. It is particularly concerned with highly unsaturated, halogenated, and irradiated rubbery copolymers of isoolefins and multiolefins, e.g., butyl rubber, produced by the radio-reaction of the copolymers with certain N-halo cyclic imides.

It has not been possible to produce modified butyl rubber copolymers, which have high unsaturation, without, at the same time, degrading the molecular weight. High molecular weight, highly unsaturated butyl rubbers are desirable because they can be readily vulcanized or co-vulcanized with other highly unsaturated rubbery polymers such as natural rubber or rubbery diene-styrene copolymers using sulfur as a curative. Butyl rubbers can be halogenated quite readily but there is no appreciable increase in the unsaturation of the rubbers. Butyl rubbers can be irradiated, as with gamma rays, but this simply degrades the rubber to a lower molecular weight and there is no change in the unsaturation, as measured by the iodine number.

According to the present invention, a butyl type rubber when irradiated in the presence of certain organic halogenating agents, produces a high unsaturation product that does not have an undue halogen content. The organic halogenating agents used in this invention are N-halo cyclic imides. The use of N-halo cyclic imides as halogenating agents for butyl rubbers has been known in the prior art. The use of these halogenating agents in the absence of radiation results in a product that is halogenated but not appreciably increased in unsaturation. In fact, the unsaturation of the thus modified rubber often is decreased. It is, therefore, an unusual feature of this invention that an appreciable increase in unsaturation can be obtained by the method of this invention, while at the same time not appreciably or undesirably increasing the halogen content of the modified butyl rubber or unduly decreasing its molecular weight.

In brief compass, the present invention proposes an improved rubber formed by admixing an isobutylene polymer having a molecular weight in the range of $2 \times 10^4$ to $5 \times 10^6$ and an original iodine number of less than 17 with in the range of 1 to 20 weight percent, based on said polymer, of an N-halo cyclic imide. The N-halo cyclic imides used contain a halogen atom selected from the group consisting of bromine and chlorine. Their molecular weight preferably is in the range of 134 to 286, and they have a combined halogen content in the range of 26.5 to 55.9 weight percent. The five member heterocyclic ring can contain one to two groups each of a ketone and imide structure, and preferably contains no vinyl unsaturation, and at least one ketone or carbonyl group. An N-halo cyclic imide structure must be used in this invention. The use of free bromine or halogen does not give equivalent results.

The rubber-imide admixture is irradiated with high intensity ionizing radiation to produce a modified rubber having a molecular weight in the range of $1 \times 10^4$ to $4 \times 10^6$, an iodine number in the range of 20 to 60, and a halogen content in the range of 0 to 0.3 weight percent.

The admixture of the rubber and the imide is preferably carried in a solvent, preferably 5 to 35 weight percent solvent on rubber, during irradiation. The imide may or may not be in solution. If not in solution, then the mixture is preferably agitated in order to insure intimate contact between the reactants.

The admixture is irradiated to the extent it receives 0.4 to 2 megaroentgens or equivalent of radiation. One of the unusual features of this invention is the small amount of radiation that can be used to obtain the modified product. With related prior art processes of this type, quite often extensive and uneconomical amounts of radiation must be used in order to obtain significant unsaturation and such large doses give unacceptable molecular weight degradation.

The modified rubber obtained according to this invention, upon curing, results in vulcanizates of increased extension modulus, i.e., at 300% elongation the modified rubbers have an extension modulus of at least 1000 p.s.i., usually 1700 to 1900 p.s.i. The modified rubbers obtained by the irradiation are readily co-vulcanizable with other rubbery polymers using sulfur alone or other conventional rubber vulcanization accelerators.

The modified rubber produced according to this invention is useful in forming rubber insulation, air springs, hosing, curing bladders, belting, proofed goods, tires and coating compositions.

The butyl rubber that is modified according to this invention is a copolymer of essentially isobutylene and a diolefin prepared at low temperatures with a Friedel-Crafts catalyst. The minor component of the copolymer is preferably 0.5 to 5 weight percent of a conjugated diene having from 4 to 14 carbon atoms per molecule. The preferred dienes are butadiene, pentadiene, cyclopentadiene, isoprene, and dimethylbutadiene, with isoprene being preferred. The isobutylene and conjugated diene are mixed in the ratio of a major proportion of isobutylene and a minor proportion of conjugated diene, the preferred range being from 1 to 10 parts of conjugated diene to 99 to 90 parts by weight of isobutylene.

The mixture of monomers is cooled to a temperature within the range of about −40° C. to −164° C. The cold mixture is then polymerized in the presence of a diluent-refrigerant and a Friedel-Crafts catalyst. The catalyst is preferably in a liquid or dissolved form. The polymerization proceeds rapidly to yield the desired polymer which precipitates out from the solution in the form of a flocculent white solid, having many of the physical characteristics of raw gum rubber. When the polymerization has reached the desired stage, the rubbery material is conveniently recovered by discharging the whole mixture into warm water, which may contain alcohol or other material to inactivate the catalyst. The warm water flashes off the excess refrigerant from the polymerized olefins. The polymer is recovered by straining or filtering, or by other means and then is dried. The method of manufacturing the rubber is more fully described in U.S. 2,356,128, Thomas and Sparks. Other means of copolymerizing the monomers can, of course, be used.

The Butyl rubber used in this invention has a molecular weight in the range of 20,000 to 5,000,000 and a Wijs iodine number in the range of 6 to 17, preferably in the range of 10 to 13. In the preferred embodiment wherein the copolymer contains isoprene, the isoprene content is in the range of 1 to 3.5 weight percent with 1.78 to 2.32 weight percent being preferred.

The irradiation of the rubber-imide admixture is carried out at a temperature in the range of −50° to 212° F., preferably −20 to 100° F. The temperature used is somewhat dependent on the particular halogenating agent used and the radiation intensity. The radiation time is in the range of a few minutes to a few hours, although time is not critical and will vary with the intensity of the radiation. The pressure is sufficient to maintain substantially condensed phase conditions, atmospheric pressure usually being satisfactory although the pressure may be in the range of 10 to 100 p.s.i.a.

It is much preferred to accomplish the modification of the Butyl rubber while the Butyl rubber is in solution with a suitable solvent. Substantially inert liquid organic solvents such as hydrocarbons having in the range of 5 to 10 carbon atoms can be used, such as hexane, mineral spirits, cyclohexane, benzene, chlorobenzene, naphthas and the like. Usually about 5 to 20 weight percent of the Butyl rubber will be dissolved in the solvent. The imide used may or may not be soluble in the solvent. If it is not soluble, it can be admixed with the Butyl rubber solution by adding it in finely divided form and agitating the mixture.

The reaction is brought about by exposing the rubber-imide admixture to high energy ionizing radiation to the extent that 0.4 to 2 megaroentgens or equivalent of radiant energy are absorbed.

By high energy ionizing radiation is meant radiation from terrestrial sources consisting of photons having a wave length less than 50 A. such as gamma and X-rays, rapidly moving charged or uncharged particles of an atomic or sub-atomic nature having an energy above 30 e.v., such as beta rays, and neutrons, of sufficient intensity so the dose rate is at least $10^{-3}$ kwh. per hour per pound of product. Expressed as pure gamma radiation, the dose rate is at least 250 roentgens per hour. This excludes radiation such as cosmic and ultra-violet, which are ineffectual for the purposes of this invention. It is preferred to use electromagnetic radiation and beta rays (electrons).

High energy ionizing radiation can be obtained from nuclear reactors, artificial accelerators such as Van de Graaff generators, from X-ray machines, from waste materials from nuclear reactors such as spent fuel elements or portions thereof, or from artificially produced isotopes, such as cobalt 60. While dose rate is not too important, the dose rate for the radiation preferably is in the range of $10^{-6}$ to 0.1 kwh. per pound per hour. This can be obtained by exposing the rubber-imide reaction mixture to the radiation, either batchwise or continuously. When using a radioisotope, the admixture can be flowed in or around the isotope in suitable containers or conduits, spaced from the isotope at a distance sufficient to obtain the desired dose rate.

As neutron radiation creates radioactive species of appreciable half-lives from chlorine, it is preferred to use neutron-free radiation when using a chlorine-containing imide as the halogenating agent. When using an imide that contains only bromine, materials that give off secondary radiation on neutron capture or photon incidence, such as boron 10, lithium 6, cadmium 113, barium 9, can be added to the admixture when neutron radiation is used to increase the effective dose rate. These isotopes can be used as pure or concentrated isotopes or the natural elements containing these isotopes can be used. The isotopes can exist as chemical compounds. They can be carried on solids, exist as distinct solids in themselves, or can be used in solution, e.g., tri-n-dodecyl borate can be used. These isotopes greatly increase the effective dose rate, as is known in the art.

After irradiation, the modified rubber can be recovered from the solution by precipitation with oxygenated hydrocarbons, particularly alcohols and ketones, such as acetone or any other known non-solvent for the rubbery material. It can be dried in a conventional manner under vacuum. Other methods of recovering the modified polymer, such as conventional spraying or drum-drying techniques, can also be used.

The modified rubbery material obtained according to this invention has a Staudinger molecular weight within the range of $1 \times 10^4$ to $4 \times 10^6$, preferably $2 \times 10^4$ to $5 \times 10^5$. It has a halogen content in the range of 0 to 0.3 weight percent which is substantially lower than the halogen content of the rubbers obtained by prior art halogenating methods. It has a surprisingly high unsaturation as shown by Wijs iodine numbers in the range of 20 to 60.

The Butyl rubber-imide admixture can be made to react in the absence of radiation. The product obtained, however, has an appreciable halogen content and the unsaturation thereof is not appreciably changed from the original Butyl rubber. The modified rubber produced according to this invention as compared to the non-irradiated reaction product of Butyl rubber and imide, has a halogen content 10 to 90% lower and an increased unsaturation of 100 to 600% as measured by iodine number. The reason for this difference is not known at this time.

One of the surprising features of this invention is that this unexpected increase in the unsaturation of the rubber is obtained without suffering severe loss in molecular weight. It is known in the prior art that irradiation of isobutylene polymers results in severe degradation. In the present invention, the average molecular weight of the modified rubber product is within 50 to 95% of the average molecular weight of the original Butyl rubber.

EXAMPLE I

The butyl rubber used in this example was a commercially sold product, ENJ Butyl 268, formed by the Friedel-Crafts polymerization of isobutylene and 1.5% isoprene. It had a viscosity average molecular weight of 450,000 and a Mooney viscosity (212° F. for eight minutes) of 65. A set of six samples, each containing 50 grams of the butyl rubber dissolved in 450 grams of normal hexane, were irradiated. One sample to which nothing else was added received one megaroentgen of radiation. Four of the samples were admixed with 5.5 grams of finely divided N-bromo-succinimide, and were irradiated with different doses. Six grams of N-bromo-succinimide were added to the sixth sample, which was then allowed to absorb 1.2 megaroentgens of gamma ray energy. To keep the N-bromo-succinimide suspended, all samples were stirred with streams of nitrogen introduced through fritted glass bubblers. Evaporation of the hexane kept the temperature in the range of 10° to 20° C. during irridation. Additional solvent was introduced periodically to replace that which evaporated.

All samples were irradiated in ordinary laboratory glassware at a dose rate of about 0.25 megaroentgen per hour. The irradiation was obtained from a cobalt 60 source, in the form of a flat plate. The containers were spaced from this source, which had a rating of about 2500 curies, at a distance to obtain the desired dose rate and were maintained in this position for a time to obtain the preselected dosage.

After irradiation, the solvent was evaporated and the various samples were cured for 45 minutes at 307° F. using the following compounding recipe:

| | Parts |
|---|---|
| Modified polymer | 100 |
| Stearic acid | 0.5 |
| Philblack O [1] | 50 |
| Zinc oxide | 5 |
| Sulfur | 2 |
| Tellurac [2] | 1 |

[1] An HAF Black.
[2] Tellurium diethyl-dithiocarbamate.

The results of these experiments are shown in Table I.

Table I

| Sample No. | N-Bromo-Succinimide, grams | Dose, Megaroentgen | Iodine No. | Mol. Wt., (thousands) | Wt. Percent Bromine | Vulcanizate Properties | | |
|---|---|---|---|---|---|---|---|---|
| | | | | | | Tensile Strength, p.s.i. | Elongation, percent | Modulus at 300% |
| 1 | 0 | 0 | ~10 | 450 | | 2,605 | 450 | 1,675 |
| 2 | 0 | 1.0 | 13.0 | 220 | <0.1 | 2,450 | 490 | 1,440 |
| 3 | 5.5 | 0.1 | 13.2 | 370 | <0.1 | 2,620 | 430 | 1,790 |
| 4 | 5.5 | 0.4 | 13.4 | 330 | <0.1 | 2,750 | 440 | 1,930 |
| 5 | 5.5 | 0.8 | 31.0 | 300 | 0.2 | 2,590 | 440 | 1,820 |
| 6 | 5.5 | 1.2 | 42.8 | 270 | 0.2 | 2,550 | 440 | 1,660 |
| 7 | 6.0 | 1.2 | 39.2 | 260 | 0.2 | 2,550 | 450 | 1,680 |

It can be seen that the unsaturation of the irradiated samples 5, 6 and 7 increased over 300% above the original value. This is when the dose rate was above 0.6 megaroentgen. Although the molecular weight of the irradiated materials of this invention decreases, it does not drop to as low a value as is obtained when the N-halo cyclic imide is absent. The tensile properties show a surprisingly high value considering the decrease in molecular weight. This is probably due to the great increase in unsaturation. Also, it is to be noted that very little bromine appeared in the final polymer.

As a comparison, 58.5 grams and 46.0 grams of the same rubber were reacted with 7.3 grams and 5.8 grams respectively of bromine in the absence of any modifying agents. The dose was 1.03 megaroentgens. The iodine number of the brominated products was 7.6 and the bromine content was 2.6 weight percent. The brominated materials had an intrinsic viscosity of 0.74. This, when compared to the irradiation of the butyl rubber in the presence of an N-halo cyclic imide, shows that the reaction product of this invention has a substantially and surprisingly lower halogen content and a much higher unsaturation.

EXAMPLE II

The same butyl rubber was reacted under conditions similar to those in Example I with N-bromo-succinimide. The results are shown in Table II.

Table II

| Sample No. | Butyl, gms. | N-bromo-Succinimide, gms. | Dose, Megaroentgen | Iodine No. | Intrinsic Viscosity | Wt. Percent Bromine |
|---|---|---|---|---|---|---|
| 8 | 52.5 | 0 | 1.0 | 11.7 | 0.92 | 0.0 |
| 9 | 42.5 | 0 | 1.0 | | | |
| 10 | 56.5 | 6.2 | 1.0 | 24.6 | 1.42 | 0.2 |
| 11 | 46.0 | 5.1 | 1.0 | | | |

Following irradiation without the halogenating agent, the unsaturation of the rubber is 11.7—just about what it was originally, 10. However, when the butyl rubber was similarly irradiated with the N-halo cyclic imide present, the iodine number jumped to 24.6. Furthermore, the intrinsic viscosity in this case is 1.42 compared to a value of 0.92 when the butyl rubber was irradiated in the absence of any n-halo cyclic imide, showing that the molecular weight degradation is negligible in the presence of an N-halo cyclic imide compared to its absence.

The two polymers obtained were cured in a standard sulfur-tellurac cure to determine tensile properties. The recipe and results are shown in Table III.

Table III

Recipe:
Polymer _____ 100
Stearic acid _____ 1
Philblack O _____ 50
Zinc oxide _____ 5
Sulfur _____ 2
Tellurac _____ 1

| Properties | Samples 8-9 | Samples 10-11 |
|---|---|---|
| 300% modulus, p.s.i. | 1,150 | 1,330 |
| Tensile, p.s.i. | 2,365 | 2,605 |
| Elongation, percent | 545 | 525 |

The materials were cured for 45 minutes at 307° F.

It can be seen that the polymer which underwent irradiation in the presence of the N-halo cyclic imide has a higher modulus, 1330 vs. 1150, and a higher tensile strength, 2605 vs. 2365, than the polymer irradiated in the absence of the modifying agent.

The compatibility of these rubbers with natural rubber (smoked sheet) are shown in Table IV. Twenty-five percent of natural rubber was added to the standard sulfur-tellurac cure and cured at 307° F. for 45 minutes.

Table IV

Recipe:
Polymer _____ 75
Natural Rubber _____ 25
Stearic Acid _____ 1
Philblack O _____ 50
Zinc Oxide _____ 5
Sulfur _____ 2
Tellurac _____ 1

| Properties | Samples 8-9 | Samples 10-11 |
|---|---|---|
| 300+ Modulus, p.s.i. | 835 | 905 |
| Tensile, p.s.i. | 835 | 1,050 |
| Elongation, percent | 100 | 185 |

The blend containing the polymer which underwent irradiation in the presence of the N-halo cyclic imide shows better compatibility with natural rubber as measured by both modulus, 905 vs. 835, and tensile strength, 1050 vs. 835, than the polymer which was irradiated in the absence of the modifying agent. It will be appreciated by those skilled in the art that these improved properties are of substantial economic importance.

EXAMPLE III

One hundred parts of the polymer formed by reacting 97 weight percent of isobutylene with 3 weight percent of piperylene using the Friedel-Crafts catalyst at a temperature of −160° C. are admixed with 15 parts by weight of 1,3-dichloro-5-5-dimethyl hydantoin. The admixture is carried in 10 weight percent, based on the polymer, of cyclohexane. This solution is irradiated at 50° F. by flowing it through the electron beam of a Van de Graaff generator operating at 2 mv. with a current of 100 microamps. The flow rate is adjusted to give an energy absorption of one megaroentgen. A highly unsaturated, rubber-like polymer is obtained.

Having described this invention, what is sought to be What is claimed is:

1. A composition comprising a reaction product of an isobutylene polymer and an N-halo cyclic imide formed by irradiating an admixture of the polymer and in the range of 1 to 20 weight percent of the imide based on the weight of said polymer with high energy ionizing radiation having an energy equivalent to at least 30 electron volts until in the range of 0.4 to 2.0 megaroentgens have been absorbed.

2. The composition of claim 1 wherein said composition has an unsaturation in the range of 20 to 60 as measured by iodine number, and a halogen content in the range of 0 to 0.3 weight percent.

3. The composition of claim 1 wherein the composition is vulcanized in the presence of additive curatives at a temperature in the range of 250° to 450° F. until it exhibits an extension modulus at 300% elongation of at least 1000 p.s.i.

4. An improved rubber formed by admixing an isobutylene polymer having a molecular weight in the range of $2 \times 10^4$ to $5 \times 10^6$ and an iodine number less than 17 within the range of 1 to 20 weight percent, based on polymer, of an N-halo cyclic imide, the halogen atoms thereof being selected from the group consisting of bromine and chlorine, irradiating the mixture so formed within the range of 0.4 to 2 megaroentgens of high energy ionizing radiation having an energy equivalent to at least 30 electron volts, said improved rubber having a molecular weight in the range of $1 \times 10^4$ to $4 \times 10^6$, an iodine number in the range of 20 to 60, and a halogen content in the range of 0 to 0.3.

5. The improved rubber of claim 4 wherein said imide has no vinyl unsaturation in the heterocyclic ring and contains a carbonyl group therein, and wherein said admixture during irradiation is carried in 5 to 35 weight percent, based on said polymer, of a hydrocarbon solvent.

6. The improved rubber of claim 4 wherein said high energy ionizing radiation consists of gamma rays obtained from an artificially produced radioisotope.

7. In a modified rubber formed by reacting an admixture of an isobutylene polymer and in the range of 1 to 20 weight percent based on polymer of an N-halo cyclic imide, the improvement which comprises effecting said reaction by irradiating said admixture with high energy ionizing radiation having an energy equivalent to at least 30 electron volts.

8. In a modified rubber formed by reacting an admixture of an isobutylene polymer and in the range of 1 to 20 weight percent based on polymer of an N-halo cyclic imide, the improvement which comprises effecting said reaction by irradiating the admixture within the range of 0.4 to 2 megaroentgens of high energy ionizing radiation having an energy equivalent to at least 30 electron volts, the irradiated rubber reaction product having a lower halogen content and at least 100% higher iodine number than the rubber product obtained by simply heating said admixture in the absence of irradiation.

9. The improved rubber of claim 8 wherein the admixture is carried in a hydrocarbon solvent during irradiation.

10. The improved rubber of claim 8 wherein said imide is an N-halo-ketocyclic imide free from double bonded carbon unsaturation in the ring, the halogen atom thereof being selected from the group consisting of bromine and chlorine.

11. The improved rubber of claim 8 wherein said imide is selected from the group consisting of N-halo-succinimide and 1,3-dihalo-5-5-dimethyl hydantoin, the halogen atom thereof being selected from the group consisting of bromine and chlorine.

12. An improved process for forming a modified rubber based upon an isobutylene polymer, which comprises admixing said rubber within the range of 1 to 20 weight percent based on polymer of an N-halo cyclic imide and irradiating the admixture within the range of 0.4 to 2 megaroentgens of high energy ionizing radiation having an energy equivalent to at least 30 electron volts.

13. The process of claim 12 wherein said organic halogenating agent is an N-halo cyclic imide, the halogen atom thereof being selected from the group consisting of bromine and chlorine.

14. A process comprising admixing an isobutylene polymer having a molecular weight in the range of $2 \times 10^4$ to $5 \times 10^6$ and an iodine number less than 17 within the range of 1 to 20 weight percent, based on polymer, of an N-halo cyclic imide, the halogen atom thereof being selected from the group consisting of bromine and chlorine, irradiating the mixture so formed within the range of 0.4 to 2 megaroentgens of high energy ionizing radiation having an energy equivalent to at least 30 electron volts, and recovering a modified polymer having a molecular weight in the range of $1 \times 10^4$ to $4 \times 10^6$, an iodine number in the range of 20 to 60, and a halogen content in the range of 0 to 0.3.

References Cited in the file of this patent

Bopp et al.: ORNL-1373, pp. 1-24, July 23, 1953.

Davidson et al.: "J. Applied Physics," pp. 427-433, vol. 19, No. 5, May 1948.

protected by Letters Patent is succinctly set forth in the following claims.